United States Patent [19]

Canzoneri et al.

[11] Patent Number: 4,986,903
[45] Date of Patent: Jan. 22, 1991

[54] INDUCED STATIC SINGLE FLOTATION CELL

[76] Inventors: Anthony S. Canzoneri, 2408 Kentucky Ave., Kenner, La. 70063; Ronald A. Boze, 19 Wisteria La., Covington, La. 70433

[21] Appl. No.: 385,005

[22] Filed: Jul. 25, 1989

Related U.S. Application Data

[63] Continuation-in-part of Ser. No. 255,505, Oct. 11, 1988, abandoned.

[51] Int. Cl.$^5$ .................... B01D 17/035; B03D 1/24
[52] U.S. Cl. ........................... 210/90; 210/104; 210/136; 210/138; 210/194; 210/195.1; 210/221.2; 210/260; 210/242.1; 210/320; 210/703; 209/170
[58] Field of Search .............. 210/221.2, 138, 194, 210/195.1, 104, 90, 703, 136, 242.1, 521, 260, 320, 221.1; 209/170

[56] References Cited

U.S. PATENT DOCUMENTS

| | | | |
|---|---|---|---|
| 1,440,129 | 12/1922 | Borchardt | 209/170 |
| 2,782,929 | 2/1957 | Colket | 210/320 |
| 3,175,687 | 3/1965 | Jones | 209/170 |
| 3,347,784 | 10/1967 | Kappe | 210/221.1 |
| 3,433,359 | 3/1969 | Lundin | 210/221.2 |
| 3,477,581 | 11/1969 | Stearns | 210/221.2 |
| 3,925,038 | 12/1975 | Weimer | 209/170 |
| 4,049,553 | 9/1977 | Stebbins | 210/221.2 |
| 4,162,972 | 7/1979 | Green | 209/170 |
| 4,277,334 | 7/1981 | Ruidisch | 210/242.1 |
| 4,338,192 | 7/1982 | Krasnoff | 209/170 |
| 4,490,248 | 12/1984 | Filippov | 209/170 |
| 4,563,274 | 1/1986 | Rothon | 210/138 |
| 4,564,457 | 1/1986 | Cairo | 209/170 |
| 4,649,281 | 3/1987 | Schmitt | 210/194 |
| 4,687,584 | 8/1987 | Urbani | 210/194 |
| 4,724,073 | 2/1988 | Calltharp | 210/221.2 |
| 4,782,789 | 11/1988 | Canzonerri | 209/170 |
| 4,800,025 | 1/1989 | BiLaeff | 210/320 |
| 4,824,579 | 8/1989 | George | 209/170 |

FOREIGN PATENT DOCUMENTS 709555 1/1980 U.S.S.R. .................... 210/242.1

Primary Examiner—David L. Lacey
Assistant Examiner—Thomas M. Lithgow
Attorney, Agent, or Firm—Thomas S. Keaty

[57] ABSTRACT

The invention relates to an apparatus for removal of suspended matter from a liquid, such as used for treatment of oil containing water. A cylindrical horizontal vessel is divided into a single gasification chamber and a single degasification chamber by a partition which extends through the interior chamber of the vessel and allows fluid communication between the two chambers. A liquid to be treated is introduced through distribution header(s) adjacent a bottom of the vessel and/or an alternative inlet nozzle which is combined with a gas eductor in order to achieve a more intimate mixture of the gas and liquid. The gas eductor has its outlet slightly above the outlet of the distribution headers. The released gas bubbles carry oil and suspended matter towards the upper portion of the vessel, from which the froth is collected through a primary skim collection trough which extends through the gasification chamber and from a vertically adjustable, based on specific gravity, secondary skim collection funnel in the degasification chamber. Skim collection is accomplished through control of the liquid level in the vessel.

20 Claims, 6 Drawing Sheets

INDUCED STATIC SINGLE FLOTATION CELL

CROSS-REFERENCE TO RELATED APPLICATIONS

This is a continuation-in-part of co-pending U.S. Pat. Application Ser. No. 255,505 filed Oct. 11, 1988 for "Induced Static Flotation Cell", the disclosure of which is incorporated by reference herein.

BACKGROUND 0 THE INVENTION

The present invention relates to a method and apparatus for removing suspended matter from liquid. The method and apparatus of the present invention have utility, for example, in separating suspended contaminants and/or oil from water.

In many industries, including oil, paper and pulp, textile, electricity generating and food processing, there is an ever present problem of contaminated water as a by-product of various processes. In particular, water is often used to aid in the production of oil and gas on offshore platforms. This water is usually pumped into formation in order to be able to pump oil out. As a result, the water becomes contaminated with oil and solids encountered in the formation, and therefore cannot be disposed of simply by dumping it into the surrounding water.

Accordingly, numerous methods and systems have been devised to reduce the contaminant content of this water to a level which allows discharge of the water into the sea.

One such system, disclosed in U.S. Pat. No. 4,255,262, comprises a device which mixes and disperses gas in the form of fine bubbles in liquid in the tank in an attempt to remove contaminants from the liquid flowing through the tank. The gas is induced from the upper section of the tank downward into the liquid in the tank via a draft tube. The gas induction occurs as a portion of the liquid contained in the vessel is recirculated back through the individual cells or compartments using a centrifugal pump. The apparatus uses an electrically driven mechanical skimmer assembly, which serves to remove contaminant-laden froth which accumulates above the liquid level section of the tank.

U.S. Pat. No. 4,564,457 discloses another system for separating suspended matter from fluid. The device comprises a cylindrical tank, having an inlet chamber, a plurality of gasification chambers, and a quiescent outlet chamber. A skim trough is disposed near the top of the tank and extends the length of the gasification chambers into the outer chamber. Vertical baffles which separate the individual chambers extend downwardly and are spaced from the bottom of the tank, allowing fluid to flow through the bottom of the tank from the inlet chamber to the outlet chamber. Each gasification chamber is equipped with an eductor nozzle assembly positioned centrally in the lower portion thereof. The nozzle assembly provides for recirculation of fluid pumped from the outlet chamber. However, this system suffers from a number of drawbacks, one of them being failure to recognize the fact that the liquid in various chambers has different specific gravity, which prevented successful skim collection through the single trough.

Additionally, the system of '457 patent cannot be utilized in applications, wherein space requirements prevent installation of multi-cell flotation units.

The present invention contemplates elimination of the drawbacks associated with previous systems known to the applicant.

SUMMARY OF THE INVENTION

The present invention solves the problems and achieves its objects through a provision of a single cell flotation unit which has improved means of skim collection which take into consideration specific gravity of liquid in a single gasification chamber and in a single degasification chamber, as well as an improved design of intimate mixing of the liquid having suspended matter therein with an injected gas. The apparatus in accordance with the present invention is provided with a horizontal, cylindrical vessel which is divided into a first gasification chamber and a second degasification chamber by a partition which is attached about its edge to the sidewall of the vessel. A fluid communication is allowed above and below the partition between the two chambers. One or more liquid distribution headers are located adjacent a bottom in the gasification chamber, introducing liquid having contaminated matter into the gasification chamber. A gas eductor is mounted at the bottom of the gasification chamber and injects gas at a level slightly above the level of liquid distribution.

A primary skim collection channel extends along the upper portion of the gasification chamber terminating at the partition.

A degasification chamber is provided with a vertically adjustable secondary skim collection means which collects skim at a level below the primary skim collection, taking into account the difference in specific gravity of liquid in the gasification chamber and in the degasification chamber. A treated liquid outlet allows exit of treated water from a bottom of the degasification chamber.

A liquid circulation line has its inlet in the degasification chamber upstream from the treated liquid outlet, so as to withdraw a portion of the degassed liquid for recirculation and injection into the gasification chamber. In accordance with the present invention, the recirculation line brings the water to a gas eductor through a special conduit and allows the liquid to exit into the gasification chamber through a liquid nozzle which is co-axially mounted within the gas eductor. A gas recirculation line withdraws gas from an upper portion of the vessel from both gasification and degasification chambers and returns the gas through the gas eductor into the gasification chamber. To control skim collection, various arrangements have been made, utilizing liquid level controllers and adjustable timers which, through the use of control valves, retain a predetermined amount of liquid in the vessel. Once the adjustable timer sends an intermittent signal to collect the skim from the primary and the secondary skim collection outlets, the level of liquid in the vessel is changed, so as to allow withdrawal of the skim from the vessel.

It is, therefore, an object of the present invention to provide an improved apparatus for treating liquid comprised of a one cell flotation unit.

It is a further object of the present invention to provide a liquid treatment apparatus having improved means for intimate mixing of the liquid with injected gas.

It is still a further object of the present invention to provide a means to control skim collection from skim collection outlets positioned at different vertical levels, utilizing changes in the liquid level within the vessel.

These and other objects of the present invention will be more apparent from the following description of the invention.

BRIEF DESCRIPTION OF THE DRAWINGS

For further understanding of the nature, objects and advantages of the present invention, reference will be had to the following detailed description, taken in conjunction with the accompanying drawings, in which like parts are given like reference numerals, and wherein.

DETAILED DESCRIPTION OF THE PREFERRED EMBODIMENT

The present invention will now be described, by way of example, and not limitation, with the influent being water contaminated with oil and other suspended particles. It is to be understood that the present invention has utility in numerous applications in which it is desireable to separate the suspended matter and/or oil from a liquid, and that the suspended matter, the liquid, or both may be the desired product of the process.

Figure 1:
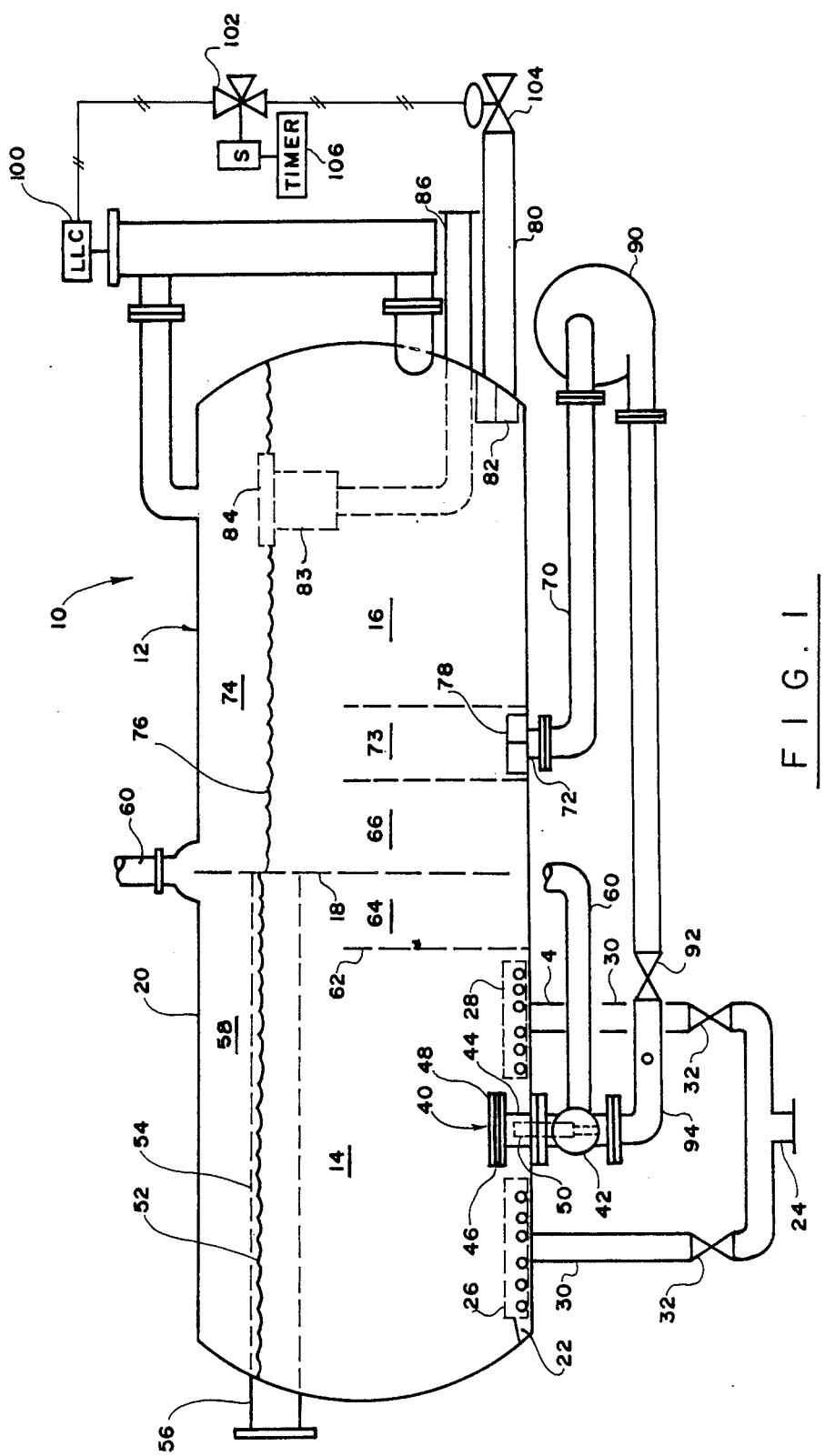
FIG. 1 is a schematic view of the preferred embodiment of the apparatus in accordance with the present invention.

Referring now to FIG. 1, the apparatus 10 of the present invention comprises an induced static flotation vessel 12 having a continuous cylindrical sidewall and capable of withstanding substantial internal pressures such as may be encountered when processing produced water from an oil well. The vessel 12 is divided into a first gasification chamber 14 and a second degasification chamber 16 by a vertical partition 18 which extends from a distance adjacent a top 20 of the vessel to a distance above a bottom 22 of the vessel 12. A contaminated liquid inlet line 24 supplies water having suspended matter therein into a pair of liquid distribution headers 26 and 28 which are positioned immediately adjacent to bottom 22 of the vessel 12. Each line 30 leading to the distribution headers 26 and 28 is provided with its control valve 3 allowing admission of liquid into the lines 30 from a common line 24. Each distribution header 26 and 28 is provided with a plurality of openings allowing multiple streams of liquid to enter the gasification chamber 14.

Figure 6:
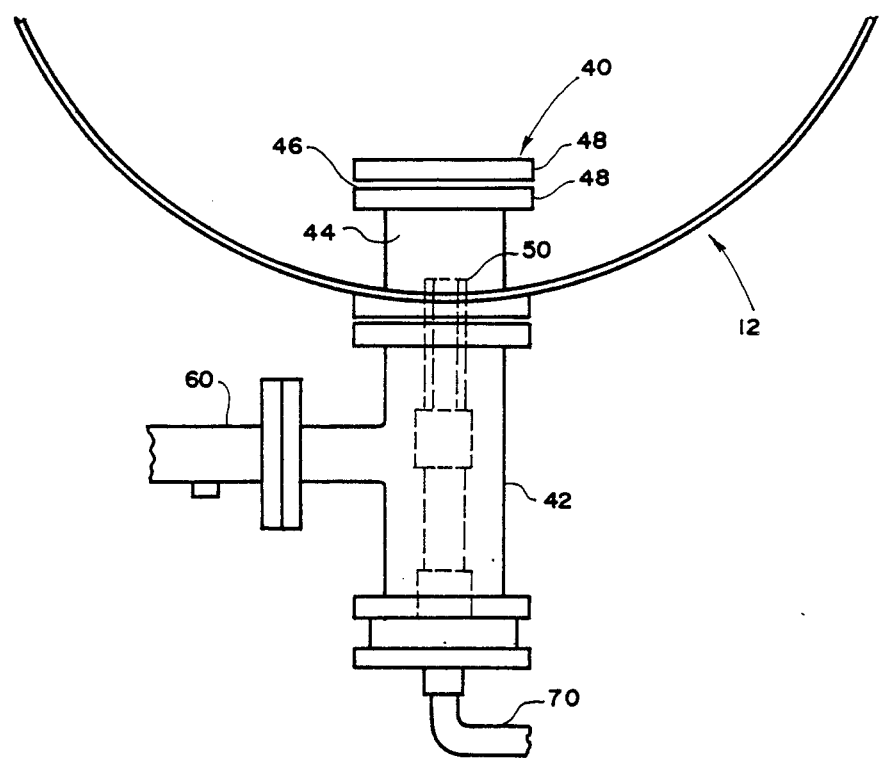
FIG. 6 is a detailed view of a gas eductor assembly having a liquid inlet nozzle therein.
Figure 7:
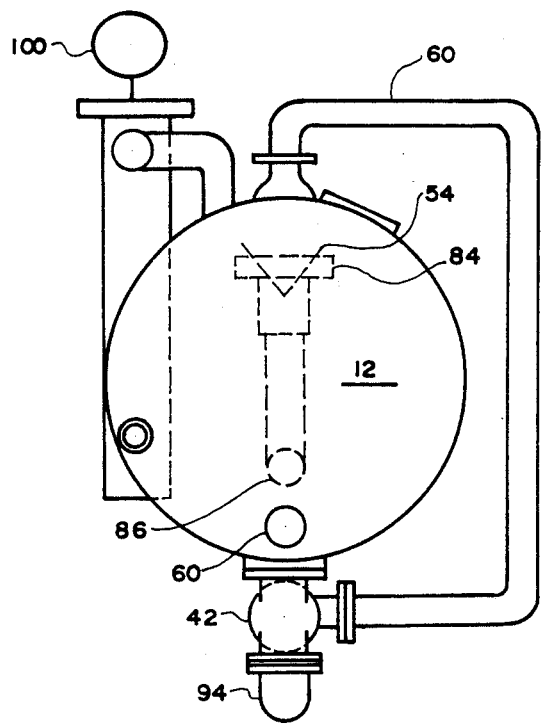
FIG. 7 is an end view of the apparatus of the present invention.

In order to achieve flotation in the vessel 12, a gas inlet means in the form of a gas eductor 40 injects gas through a gas conduit 42 into the line 44, from which the gas exits through a slot 46 formed between two eductor plates 48 (see FIG. 6).

As can be seen in the drawings, the gas changes its direction at 90 degree angle, impinging on the upper of the plates 48 of the eductor 40. A portion of the liquid introduced into the gasification chamber 14 is delivered through an inlet liquid nozzle 50 which is co-axially mounted within the conduit 42 and which is fluidly connected with a liquid recirculation line 70 as will be described hereinafter. An intimate mixing of liquid and gas is achieved by forcing the liquid and gas to impinge against the upper plate 48 and change the direction of flow at a 90 degree angle. As a result, a plurality of microscopic gas bubbles are generated and are uniformly dispersed within the gasification chamber 14.

The oil and solids collect on the surface of the gas bubbles and float upwardly towards the upper portion of the chamber. Upon rising to the fluid surface level 52 of the gasification chamber 14, the mixture of gas and oil forms a froth which is skimmed by a primary skim collection trough 54 extending substantially along the entire length of the gasification chamber 14 and terminating at the partition 18. The liquid level in the embodiment shown in FIG. 1 is retained, based on the specific gravity of liquid in the gasification chamber 14 at a level below an edge of the skim trough 54. A skim outlet 56 allows withdrawal of the collected froth outside of the vessel 12.

Any released gas rises above the fluid surface level 52 into the gas space 58, from which it is recirculated through a gas recirculation line 60 into the eductor 40.

As more liquid is introduced through the inlet 24, the liquid is forced to move from the gasification chamber 14 towards the degasification chamber 16. In order to prevent liquid from bypassing its mixing with the gas, a baffle plate 62 is positioned upstream from the partition 18 and extends vertically upwardly from the bottom 22 of the vessel 12 to about mid portion of the vessel. The baffle plate 62 is semicircular in shape and is attached to the sidewall of the vessel 12 about its circumferential edge.

The liquid moving from the chamber 14 moves upward above the baffle plate 62, downwardly into the space 64 between the baffle 62 and the partition 18 and moves under the partition 18 to a space 66 formed by a first deflector plate 68 of the degasification chamber 16. As the fluid rises in the space 66, small gas bubbles continue to be released and are deflected away from an inlet 72 of the liquid recirculation means 70. The gas moves upwardly towards a gas space 74 above a liquid level 76 of the degasification chamber 16. This gas is evacuated through the gas recirculation line 60 into the eductor 40.

To form an eductor pump suction chamber 73, a second deflector plate 69 is positioned in parallel relationship to the deflector plate 68 and extends vertically upwardly from the bottom 22 of the vessel 12 a distance adjacent a mid portion of the vessel 12. A vortex breaker 78 is placed in the liquid eductor line 72 to eliminate vortexing and the aspiration of gas which could cause cavitation of eductor pump 90.

The fluid is retained in the degasification chamber 16 for a predetermined period of time to permit the fluid to further degas and release any remaining coalesced oil to rise to the surface 76. The liquid level 76 in the degasification chamber 16 is lower than the liquid level 52 in the gasification chamber 14, since the fluid in the gasification chamber 14 has a lower specific gravity than degassed liquid in the degasification chamber 16. The treated water is withdrawn from the vessel 12 through a liquid outlet 80 which is provided with a vortex breaker 82 on the interior of the chamber 16.

A secondary skim collection means 83 is positioned within the chamber 16 to collect any remaining oil collected on the surface 76. The skim collection means 83 is provided with a skim collection funnel 84 and skim collection outlet line 86 extending through the end of the vessel 12 to the outside thereof. The skim collection means can be manually or automatically vertically adjustable depending on the specific gravity of liquid in chamber 16.

A number of alternative skim collection arrangements is disclosed in the present invention. Referring to the embodiment shown in FIG. 1, a liquid level controller 100 is located on the degasification chamber 16 or in the uppermost section of the degasification chamber 16 and is adjusted to control level 52 slightly below the uppermost edge of the skim collection V-trough 54 by sending a control signal through a three-way solenoid valve 102 to an outlet control valve 104 which is mounted in the liquid outlet line 80. A vertically adjustable secondary skim collection funnel 84 is adjusted slightly above the fluid level 76 in the degasification chamber 16. The valve 104 is normally throttled open, so as to retain this liquid level. Depending on the amount of impurities in the liquid introduced into the vessel 12, an adjustable timer 106 is set to interrupt the control signal from the liquid level controller 100 to the liquid outlet control valve 104, causing the valve to close or throttle to a reduced opening for a predetermined period and duration of closure. This causes the liquid levels 52 and 76 to rise and spill oily froth and suspended solids collected on the surfaces into the skim collection trough 54 and funnel 84. From there the froth is evacuated through the primary skim collection outlet 56 and secondary skim collection outlet 86.

A portion of the liquid from the degasification chamber 16 is withdrawn through the liquid recirculation line 70 by suction pump 90 and delivered through a control valve 92 to the conduit 94 fluidly connected with the liquid nozzle 50.

Figure 2:
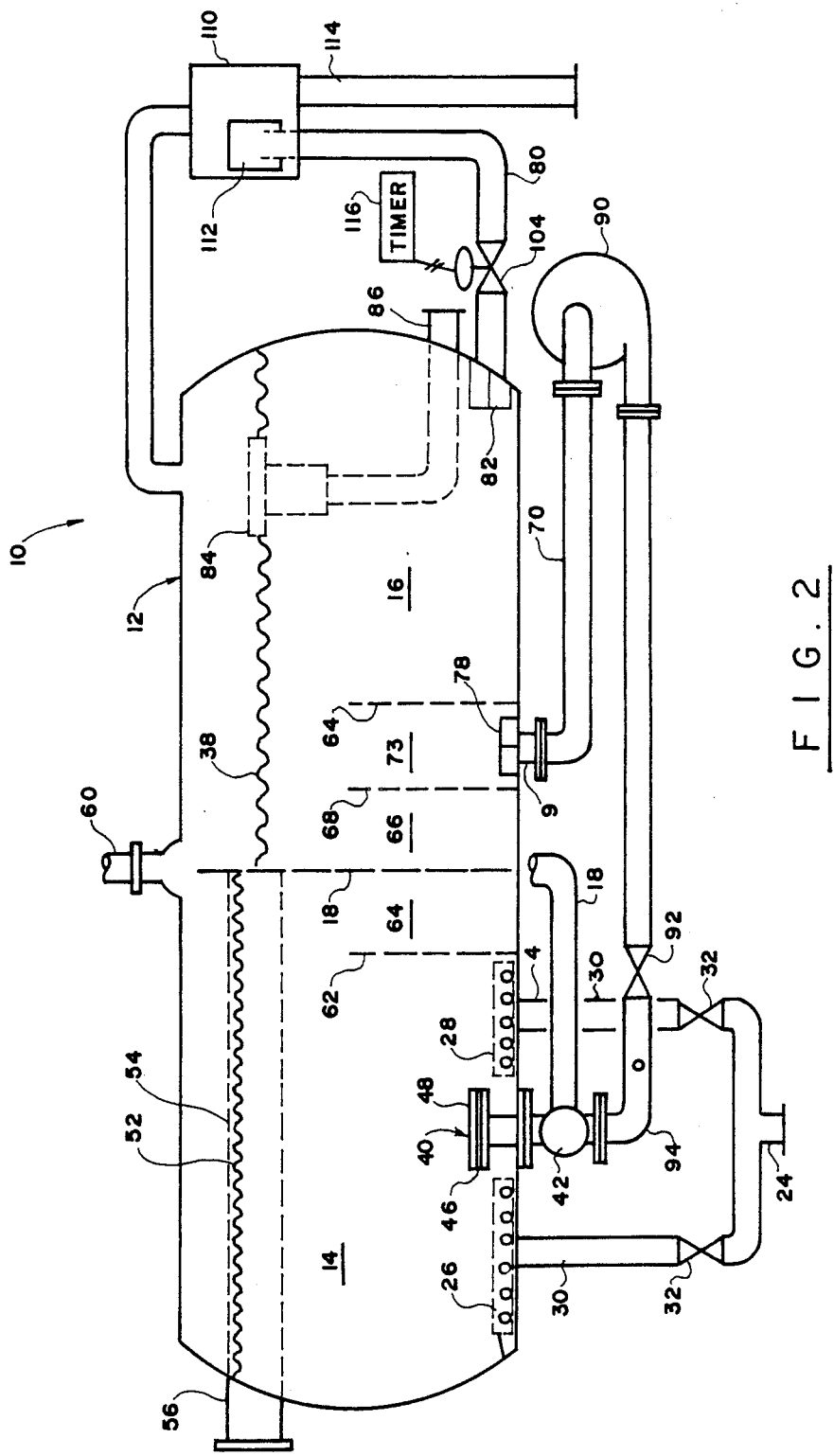
FIG. 2 is a schematic view of the preferred embodiment of the apparatus of the present invention utilizing an alternative skim collection arrangement.

Referring now to FIG. 2, an alternative arrangement of skim collection is disclosed. A head chamber 110 is located on the uppermost section of degasification chamber 16 in the vessel 12. A vertically adjustable nozzle 112 has its exit within the chamber 110. The nozzle 112 is adjusted to maintain a predetermined level of liquid in the degasification chamber 16 by allowing the liquid to escape through conduit 80 flowing into head chamber 110. The liquid level within the chambers 14 and 16 is adjusted to be slightly below the primary skim collection trough 54 and secondary skim collection funnel 84. The treated water exits the vessel 12 through a normally open valve 104 and moves upwardly through the line 80 towards the vertically adjustable nozzle 112, from which it overflows and moves from the head chamber 110 into the head chamber outlet line 114.

Depending on the amount of impurities in the inlet liquid, the timer 116 is set to intermittently close valve 104 for a predetermined period of time or to cause the valve 104 to throttle, thus causing the level of liquid in the vessel 12 to rise under the influence of the incoming fluid. The oily froth is raised along with the liquid level and spills into the primary skim collection trough 54 and secondary skim collection funnel 84, from which the froth is removed through the skim outlet lines 56 and 86, respectively.

Figure 3:
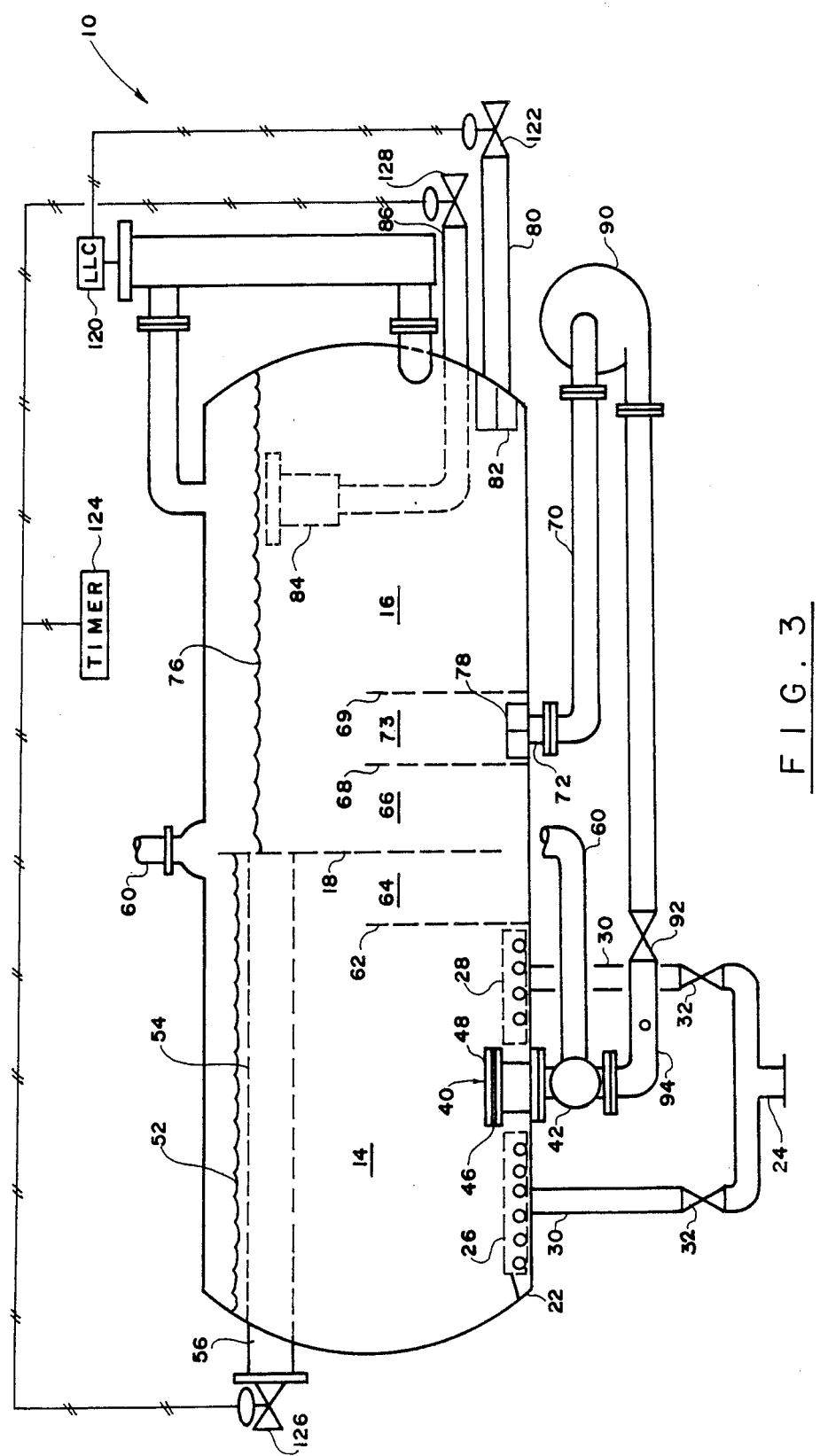
FIG. 3 is a schematic view of the apparatus of the present invention utilizing still further alternative skim collection arrangement.

Referring now to FIG. 3, a further alternative arrangement of skim collection in accordance with the present invention is illustrated. As can be seen in the drawing, a liquid level controller 120 is located on the uppermost section of the degasification chamber 16. The liquid level controller is adjusted to control level 52 of liquid in the gasification chamber 14 and liquid level 76 in the degasification chamber 16 slightly above an upper edge of the primary skim collection trough 54 and secondary skim collection funnel 84. The liquid level controller 120 sends a signal to the treated liquid outlet valve 122 to retain a predetermined flow of treated liquid from the vessel 12. The oily froth and suspended solids collect in the upper portions of the gasification chamber 14 and degasification chamber 16 for a predetermined period of time. A timer 124 is adjusted to send an intermittent signal to a primary skim collection outlet valve 126 and secondary skim collection outlet valve 128, respectively, so as to allow the collected froth to exit vessel 12 through the lines 56 and 86.

Figure 4:
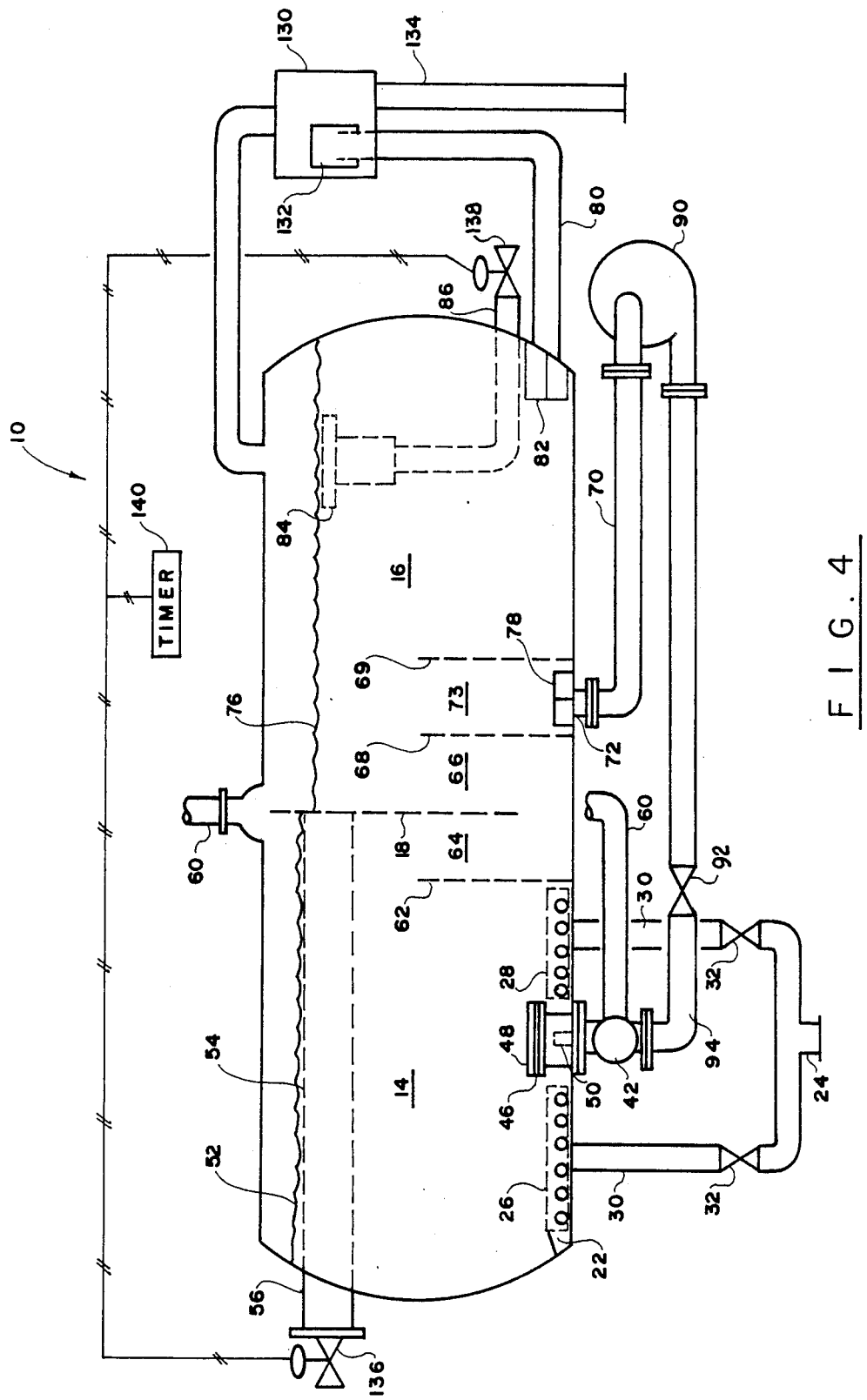
FIG. 4 is a schematic view of the apparatus of the present invention utilizing still further alternative skim collection arrangement.

Reference will now be made to FIG. 4, wherein still a further alternative arrangement of skim collection in accordance with the present invention is disclosed. As can be seen in the drawing, a head chamber 130 is provided on the uppermost section of the degasification chamber 16. A treated liquid outlet line 80 is provided with a vertically adjustable nozzle 132 which is positioned in the head chamber 130. The treated liquid moving from the vessel 12 through the line 80 overflows the top edge of the adjustable nozzle 132 and exits the chamber 130 through the head chamber outlet line 134. The adjustable nozzle 132 allows to control a liquid level within the gasification chamber 14 and degasification chamber 16 slightly above the upper edge of the skim collection trough 54 and skim collection funnel 84. The primary skim collection valve 136 is mounted on the outlet of the primary skim collection line 56. A similar skim collection outlet valve 138 is mounted on the outlet of the secondary skim collection outlet line 86. An adjustable timer 140 sends intermittent signals to open valves 136 and 138, causing the valves to open for a predetermined period and at certain intervals, allowing the oily froth and solids which have collected above the trough 54 and funnel 84 to exit the vessel 12 through the skim collection outlet lines 56 and 86, respectively.

Figure 5:
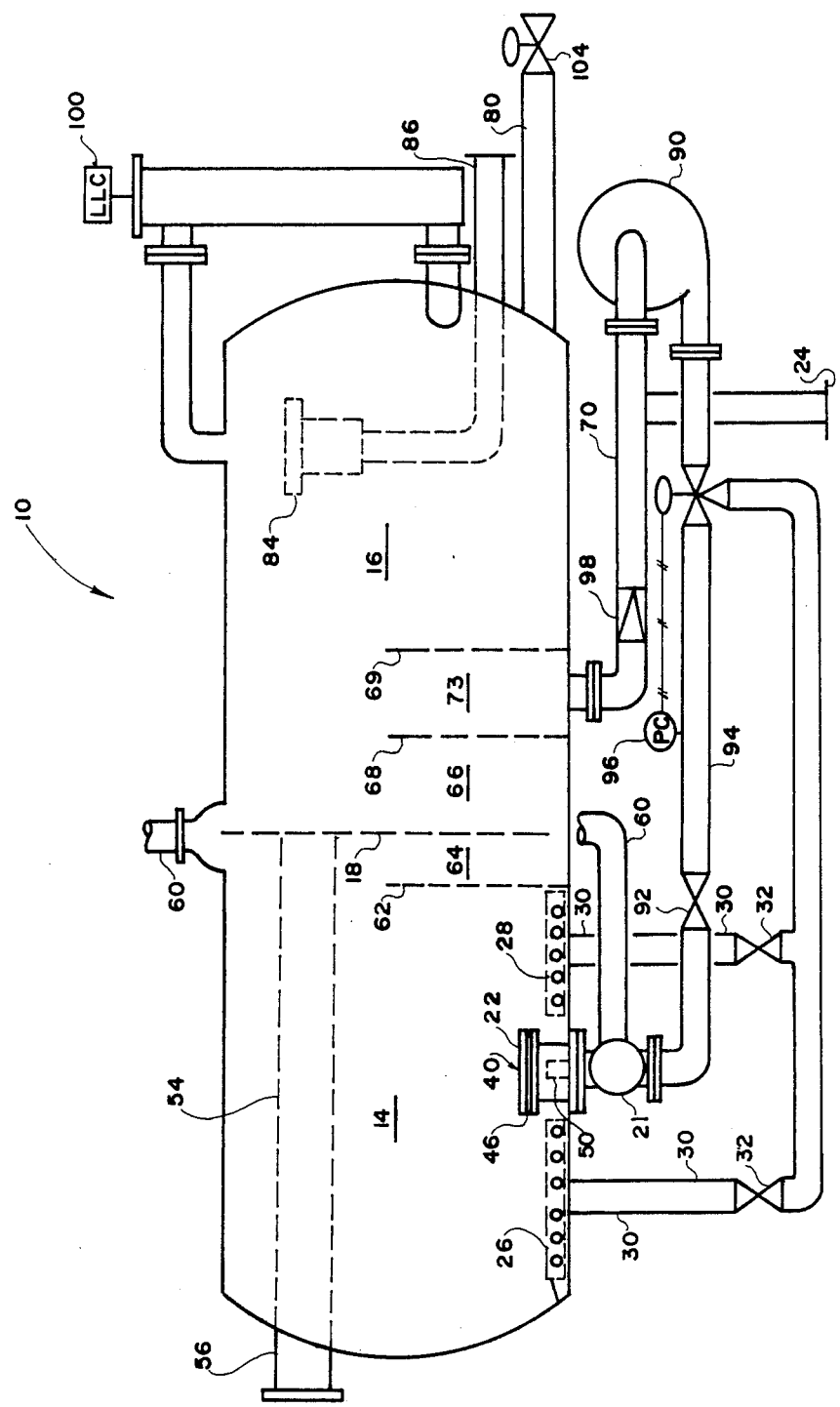
FIG. 5 is a schematic view of the apparatus of the present invention illustrating an alternative liquid introducing arrangement.

Referring now to FIG. 5, an alternative influent arrangement will now be discussed. This arrangement allows an intimate mixing of influent oily water and suspended solids with gas, thus allowing better skim generation and treatment of fluid. Influent oily water and suspended solids enter line 24 and flow through an eductor pump 90 and a three-way pressure control valve 95 (or other suitable means of bypassing) into the line 94 and from there into the liquid inlet nozzle 50. In this manner, an improved mixture of gas and liquid is achieved. A pressure controller 96 adjusts the three-way valve 95 to maintain a proper pressure on the eductor nozzle 50. Any excess liquid is diverted by the three-way valve 95 (or other suitable means of bypassing) to lines 30 which lead to the primary liquid distribution means, in the form of headers 26 and 28. Similarly to the embodiments shown in FIGS. 1 through 4, the distribution headers 26 and 28 are positioned below a slot 46 through which a mixture of gas and water exits the eductor assembly 40.

When the head pressure in feed line 24 is above the pressure in line 70, the check valve 98 is closed. Note the check valve 98 is positioned upstream from the eductor pump 90 in the liquid circulation line 70. The same is true for condition when the pressure in the inlet connection 24 and the line 70 is equalized. However, when the pressure in the vessel 12 is greater than in the inlet line 24, the valve 98 opens to admit supplemental fluid from the degasification chamber 16 into the liquid circulation line 70. The check valve 98 is normally closed to prevent influent water from contaminating the water in degasification chamber 16.

This alternative influent arrangement can be used with any of the skim control arrangements discussed above.

While a number of embodiments of the present invention have been described herein, it is to be understood that various modifications can be made thereto without departing from the spirit of the present invention. I therefore pray that may rights to the present invention be limited only by the scope of the appended claims.

I claim:

1. An apparatus for removal of suspended matter from a liquid, comprising:
   a substantially cylindrical vessel having an interior chamber adapted to receive a flow of liquid having suspended matter therein;
   a non-continuous separation wall means dividing the interior chamber into a gasification and a degasification chambers, said separation wall means allowing fluid communication between gasification and degasification chambers;
   a primary liquid inlet means for introducing the flow of liquid having suspended matter therein into the gasification chamber, said liquid inlet means comprising at least one liquid header means positioned adjacent a bottom of the gasification chamber and having a plurality of openings to allow admission of the liquid into the gasification chamber;
   a gas inlet means for introducing a flow of gas into the gasification chamber attracting the suspended matter and for carrying the suspended matter upwardly to an upper portion of the vessel, said gas inlet means comprising at least one gas eductor means injecting gas into the gasification chamber at a level above said liquid header, said gas inlet means further comprising a secondary liquid inlet means in said gas eductor means for educting said gas;
   a primary skim collection means extending along the upper portion of the gasification chamber;
   a secondary skim collection means positioned in the degasification chamber, said secondary skim collection means comprising vertically adjustable means for controlling skim collection based on difference in specific gravity of liquid in the degasification chamber and the gasification chamber;
   treated liquid outlet means for removing treated liquid from the degasification chamber; and
   means for controlling skim collection from said primary and said secondary skim collection means.

2. The apparatus of claim 1, further comprising means for recirculating a portion of liquid having an inlet upstream from said treated liquid outlet means in the degasification chamber.

3. The apparatus of claim 1, further comprising means for recirculating released gas fluidly connecting the upper portion of the vessel and said gas inlet means.

4. The apparatus of claim 1, wherein said treated liquid outlet means is provided with a vortex breaker.

5. The apparatus of claim 1, wherein said means for controlling skim collection comprise normally closed skim collection outlet valve means positioned in said primary and said secondary skim collection means, an adjustable timer means operatively connected to said skim collection outlet valve means, said timer means comprising means for sending an intermittent signal to said valve means for opening said valve means, and a normally opened vertically adjustable nozzle means connected to said treated liquid outlet means and for maintaining a predetermined liquid level in the vessel.

6. The apparatus of claim 2, wherein said means for liquid recirculation are in fluid communication with said secondary liquid inlet means.

7. The apparatus of claim 1, further comprising means to prevent liquid from bypassing intimate mixing with injected gas positioned upstream from said separation wall means.

8. The apparatus of claim 7, wherein said means to prevent bypassing comprise a baffle means extending vertically upwardly from a bottom of the vessel to about mid-portion of the vessel.

9. The apparatus of claim 2, further comprising means for preventing liquid turbulence adjacent an inlet to said means for liquid recirculation.

10. The apparatus of claim 9, wherein said means for preventing liquid turbulence comprise a pair of baffle plates extending from a bottom of the degasification chamber a distance vertically upwardly on diametrically opposite sides of said inlet of the liquid recirculation means.

11. The apparatus of claim 9, wherein said inlet of the liquid recirculation means is provided with a vortex breaker.

12. The apparatus of claim 2, wherein said secondary liquid inlet means has a liquid inlet nozzle means which is coaxially mounted in said gas eductor means.

13. The apparatus of claim 12, wherein said primary and secondary liquid inlet means comprises means for liquid bypassing located upstream from said primary and said secondary liquid inlet means, and wherein said secondary liquid inlet means comprising a pressure control means associated with said means for bypassing for controlling a predetermined flow of liquid through said liquid inlet nozzle means and diverting any excess liquid through said primary liquid inlet means.

14. The apparatus of claim 13, wherein said liquid recirculation means is provided with a check valve means mounted upstream from said means for bypassing, said check valve means opening when a value of pressure in the vessel greater than a value of pressure in the primary liquid inlet means is experienced.

15. The apparatus of claim 1, wherein said means for controlling skim collection comprise a liquid level controller means connected to an upper portion of the vessel and which transmits a signal to a valve means connected to the treated liquid outlet means to retain a predetermined flow of treated liquid from the vessel, and an adjustable timer means for intermittently interrupting the signal from the liquid level controller means to the liquid outlet valve means, thus causing increase in liquid level within the vessel to allow skim collection.

16. The apparatus of claim 1, wherein said means for controlling skim collection comprise a normally open treated liquid outlet valve means, a vertically adjustable nozzle means connected to said treated liquid outlet valve means downstream from said treated liquid outlet valve means and for maintaining a predetermined level of liquid in the vessel, and an adjustable timer means for transmitting an intermittent signal to said treated liquid outlet valve means to cause increase in liquid level within the vessel, so as to allow skim collection through said primary and said secondary skim collection means.

17. The apparatus of claim 1, wherein said means for controlling skim collection comprise a liquid level controller means connected to an upper portion of the vessel for transmitting a signal, a usually open treated liquid outlet valve means which receives said signal from said liquid level controller means for maintaining a predetermined liquid level above the skim collector means in the vessel, an adjustable timer means and a normally closed skim collection outlet valve means mounted in the primary and the secondary skim collection means and for opening in response to intermittent signals from said timer means.

18. An apparatus for removal of suspended matter from a liquid, comprising:
a substantially cylindrical vessel having an interior chamber adapted to receive a flow of liquid having suspended matter therein;
a non-continuous separation wall means dividing the interior chamber into a gasification chamber and a degasification chamber, said separation wall means allowing fluid communication between the gasification and degasification chambers;
a gas inlet means for introducing a flow of gas into the gasification chamber for attracting the suspended matter and for carrying the suspended matter upwardly to an upper portion of the vessel;
a liquid inlet means for introducing the flow of liquid into the gasification chamber, said inlet means comprising a primary liquid distribution means located at a level below said gas inlet means and a secondary liquid distribution means having a liquid inlet nozzle means which is co-axially mounted in said gas inlet means, means for liquid bypassing fluidly connected to said primary and said secondary liquid distribution means upstream therefrom, and wherein said secondary liquid distribution means comprise a pressure control means associated with said means for bypassing for controlling a predetermined flow of liquid throughout said liquid inlet nozzle means and divert any excess liquid through said primary liquid distribution means;
a primary skim collection means extending along the upper portion of the gasification chamber;
a secondary skim collection means positioned in the degasification chamber, said secondary skim collection means comprising vertically adjustable means for controlling skim collection based on a difference in specific gravity of liquid in the degasification chamber and the gasification chamber;
a treated liquid outlet means for removing treated liquid from the degasification chamber; and,
a means for controlling skim collection from said primary and secondary skim collection means.

19. The apparatus of claim 18, further comprising liquid recirculation means provided with a check valve means mounted upstream from and connected to said means for bypassing, said check valve means opening when a value of pressure in the vessel greater than a value of pressure in the liquid inlet means is experienced.

20. An apparatus for removal of suspended matter from a liquid, comprising:
a substantially cylindrical vessel having an interior chamber adapted to receive a flow of liquid having suspended matter therein;
a non-continuous separation wall means dividing the interior chamber into a gasification and a degasification chambers, said separation wall means allowing fluid communication between gasification and degasification chambers;
a liquid inlet means for introducing the flow of liquid into the gasification chamber;
a gas inlet means for introducing a flow of gas into the gasification chamber for attracting the suspended matter and for carrying the suspended matter upwardly to an upper portion of the vessel;
a primary skim collection means extending along an upper portion of the gasification chamber;
a secondary skim collection means positioned in the degasification chamber, said secondary skim collection means comprising vertically adjustable means for controlling skim collection based on a difference in specific gravity of liquid in the degasification chamber and the gasification chamber;
treated liquid outlet means for removing treated liquid from the degasification chamber;
means for controlling skim collection from said primary and said secondary skim collection means; and
said means for controlling skim collection comprising a normally closed skim collection outlet valve means positioned in said primary and said secondary skim collection outlet means, an adjustable timer means operatively connected to said skim collection outlet valve means, said timer means comprising means for sending an intermittent signal to said valve means for opening said valve means, and a normally open vertically adjustable nozzle means connected to said treated liquid outlet means for maintaining a predetermined liquid level in the vessel.

* * * * *